United States Patent
Baratz et al.

(10) Patent No.: US 7,106,849 B2
(45) Date of Patent: Sep. 12, 2006

(54) HYBRID INTELLIGENT NETWORK

(75) Inventors: Yaron Baratz, Herzelia (IL); Dror Fixler, Ganey Tikva (IL); Uri Savoray, Rehovot (IL)

(73) Assignee: Septier Communications Ltd., Petach Tikva (IL)

( * ) Notice: Subject to any disclaimer, the term of this patent is extended or adjusted under 35 U.S.C. 154(b) by 126 days.

(21) Appl. No.: 10/981,656

(22) Filed: Nov. 5, 2004

(65) Prior Publication Data

US 2005/0111650 A1    May 26, 2005

(51) Int. Cl.
  *H04M 7/00*  (2006.01)
  *H04M 3/42*  (2006.01)
  *H04L 12/66* (2006.01)

(52) U.S. Cl. .................... 379/221.08; 379/207.02; 370/352

(58) Field of Classification Search ..............
  379/207.02–207.04, 219, 220.01, 221.01,
  379/221.08–221.12, 111, 112.06, 112.1, 114.14,
  379/114.15, 114.16; 370/352
  See application file for complete search history.

(56) References Cited

U.S. PATENT DOCUMENTS

| | | | |
|---|---|---|---|
| 5,521,902 A * | 5/1996 | Ferguson | 370/248 |
| 5,726,972 A | 3/1998 | Ferguson | |
| 6,011,845 A * | 1/2000 | Nabkel et al. | 379/266.01 |
| 6,295,351 B1 | 9/2001 | Malik et al. | |
| 6,542,593 B1 * | 4/2003 | Bowman-Amuah | 379/201.03 |
| 6,718,023 B1 * | 4/2004 | Zolotov | 379/133 |
| 6,731,730 B1 * | 5/2004 | Zolotov | 379/126 |
| 2001/0019606 A1 | 9/2001 | Tuunanen | |
| 2002/0034190 A1 | 3/2002 | Baratz | |
| 2003/0125968 A1 * | 7/2003 | Uppal | 705/1 |
| 2004/0013251 A1 | 1/2004 | Boussageon | |
| 2004/0233851 A1 * | 11/2004 | Baldwin et al. | 370/241 |

* cited by examiner

*Primary Examiner*—Benny Quoc Tieu
(74) *Attorney, Agent, or Firm*—Mark M. Friedman

(57) ABSTRACT

Methods and systems for providing Intelligent Network services are provided. Signaling probes separate from a switch listen to traffic on a signaling network wherein the switch communicates with other switches and subscriber equipment. Events identified within the signaling traffic are communicated to a Service Contact Point (SCP) via an ancillary network such as a packet switch network. Optionally, the SCP relays a command to the switch in response to the detected event.

35 Claims, 5 Drawing Sheets

HYBRID INTELLIGENT NETWORK

FIELD OF THE INVENTION

The present invention is generally related to methods and systems for telecommunications, and in particular, to Intelligent Networks.

BACKGROUND OF THE INVENTION

The Public Switched Telephone Network (PSTN) is the backbone for providing telephony services to business and individuals in the United States. The PSTN includes a number of switches, generally designated as Service Switching Points (SSPs), for interconnecting a calling party's line to a called party's line. Prior to the 1960's, to complete a call between a calling party and a called party, signaling would occur over the trunk circuits between the switches to ensure that the called party was not busy and to establish a connection between the two parties. This earlier version of the PSTN was rather inflexible in that changes to the PSTN could only occur with the replacement of the hardware in the PSTN. For instance, at this time, the SSPs were hard-wired and had to be replaced with a new SSP in order to update the switch's capability. The switches, however, could not be quickly updated since the standards and specifications had to be well-defined for the various switch vendors. To address the delays in updating switches, these hard-wired SSPs were ultimately replaced with SSPs that had stored program control (SPC). As a result, rather than replacing an entire SSP, the SSP could be modified to enable a new feature simply by updating the software in the SSP. Even with SPC in the SSPs, the PSTN was still limited in the services that the PSTN could provide.

A major advancement to the PSTN occurred in the mid-1970's with the introduction of Signaling Transfer Points (STPs) and Signaling System number 7 (SS7) protocol. With the addition of SS7 and STPs to the PSTN, call setup information is routed over a signaling network formed between the STPs and no longer occurred directly over the trunks. For instance, a calling party's SSP would send a data query from one of its associated STPs to an STP associated with the called party. The called party's STP would then determine whether the called party's line was idle and would perform the necessary signaling over the SS7 data network to connect the call. Thus, whereas before call setup signaling would occur over the voice trunks, the STPs and SS7 signaling bypass this traffic away from the voice trunks and onto dedicated data lines. As a result, the capacity of the PSTN to carry voice calls was greatly increased.

In the mid-1980's, demand for additional services from the PSTN resulted in the Intelligent Network. In general, the Intelligent Network provides service logic external to the SSPs and places this logic in databases called Service Contact Points (SCPs). To accommodate in the Intelligent Network, the SSPs have software to detect service-specific features associated with the Intelligent Network. The software in the SSPs define hooks or "triggers" for the services that require use of an SCP. In response to a trigger, an SSP queries an associated SCP for relevant routing information. For instance, the Intelligent Network permits 800 service and calling card verification service, both of which require a query from the SSPs to the SCP through an STP and the return of routing information to the SSP through an STP. A Service Management System (SMS) was also introduced into the PSTN with the Intelligent Network and provides necessary support in service creation, testing, and provisioning. The SMS communicates with the SCPs and provides software updates to the SCPs.

The demand for increased capabilities has more recently transformed the Intelligent Network into an Advanced Intelligent Network (AIN). The AIN differs from the Intelligent Network in that the AIN provides service independent capabilities whereas the Intelligent Network was limited to service-specific capabilities. AIN provides a high level of customization and builds upon basic services of play announcement, digit collection, call routing, and number translation. Some examples of AIN services include abbreviated dialing beyond a central office, do not disturb service for blocking calls from certain numbers or at certain times, and area number calling service which allows a company to have one advertised telephone number but to have calls routed to a nearest business location.

In recent years, the explosive growth of the mobile industry as well as new products such as prepaid services have placed ever increasing demands on the Intelligent Network. Examples of services for which there is a need to implement in the Intelligent Network include Location Based Services such as location based advertising or wireless 911, prepaid wireless and wireless callbacks.

FIG. 1 provides a simplified diagram of the architecture of an exemplary Intelligent Network. Subscriber Equipment SE 110, such as a telephone, a mobile station, a computer, or a fax, for example, is connected via a first signaling network 118 to a SSP 102 or via a Network Access Point NAP. The SSP 102 provides the user with access to the network and attends to all necessary dialing functions. The SSP is also able to detect the need for an Intelligent Network service request. In functional terms, the SSP includes call management, routing, and service dialing functions. Furthermore, SSPs are capable of communicating with other SSPs 112 across the first signaling network 118. It is noted that appropriate switching network protocols include SS7 protocols, such as global system for mobile communications (GSM) and code division multiple access (CDMA), or data network protocols, such as general packet radio service (GPRS), universal mobile telephone system (UMTS) and 1XRTT (also known as CDMA2000). The SSPs 102 communicate using a second signaling network 104 with at least one of the SCPs 106, which include Service Logic Programs SLP, which are used to produce network services. Thus, the SCPs 106 are capable of communicating with switches in appropriate protocols (e.g. INAP, WIN) for setting up triggers, accepting trigger events, and responding with instructions. It is noted that the second signaling network 104 is also used to switch calls.

Each SCP is optionally connected to one or more Service Data Points (SDP) 108. The Service Data Point SDP 108 is a database containing such data about the subscriber and the Intelligent Network which the SCP service programs use for producing individualized services. The SCP uses SDP services directly by way of a signaling or data network.

The optional Intelligent Peripheral IP 114 provides special functions, such as announcements, and voice and multiple dialing identification.

One exemplary protocol commonly used in the second signaling network is SS7, a known signaling system described in the Specifications of Signalling System No. 7 of the CCITT (nowadays ITU-T), Melbourne 1988.

Thus, in the course of operations a SCP 106 routes a plurality of requests to establish triggers over the second signaling network 104 to one or more SSPs 102. Triggers correspond to specific or general event detected at the switch 102, including the dialing of a toll-free number such as a '800' number, a call reaching subscriber with a particular number, the dialing of a specific number starting with '011' by a particular subscriber, an off-hook event, a mobile subscriber entering a specific cell region, and so on. Whenever an event matching the conditions of the trigger is detected at the switch 102, the switch 102 stops, sends a message over the second signaling network 104 informing an SCP 106 of the event, and awaits instructions, which are routed back to the SSP 102 over the primary signaling network 104. Examples of instructions that the SCP 106 sends to the switch 102 include commands to continue as normal, terminate the call, transfer the call to a particular subscriber, transfer the call to an "Intelligent Peripheral" (IP)—which may play a prompt, collect dialed digits, etc.

FIG. 2 provides a simplified flow chart describing the aforementioned event handling mechanisms from the perspective of the switch 102. In general, the switch (SSP) 102 operates 206 according to a set of triggers which have been set 204 according to instructions 202 received over the second signaling network 104 from an SCP 106. When, in the course of operation an event transpires, the SSP must handle the event 208. Block 210 indicates that if the event does not match any of the triggers, the switch 102 proceeds to operate 204 as before, but if the event does match a trigger, the switch 102 must inform 212 the SCP 106 of the event, where this information is communicated over the second network 104. The switch 102 then waits 214 for a response from the SCP 106, which is sent to the switch 102 over the second signaling network 104. Upon receiving the instructions 216, the switch 102 responds to the event 218, and reverts to normal operating mode 206.

This aforementioned architecture presents a myriad of possible problems. First of all, it is noted that the SCP 106 and the switch (SSP) 102 communicate through the second signaling network 104, which is part of the primary signaling network (mostly the SS7 network). This network is a most critical network inasmuch as it is responsible for the most basic services of the network: switching calls. When Intelligent Network communication is excessive, it can harm or even overwhelm the signaling network. This is considered risky, and potential outages are unacceptable.

Furthermore, the need for the switches 102 (SSP) to handle triggers imposes an additionally processing load on the switch itself. Once again, this is unacceptable because the switch 102 is also responsible for switching calls. If these triggers are few or only pertain to a small number of events, then this load is insignificant. But, many applications require setting up triggers for large groups of subscribers, and for widespread events. For example, pre-paid wireless subscribers applications require a trigger for each and every call the subscriber makes, as well as a periodic trigger in order to verify at each stage that the subscriber has the appropriate positive balance to proceed with the call. Location based services, which require the location of each subscriber of a cellular network, are implemented by setting up a trigger for the event of a subscriber moving from one cell to another. As the volume is Intelligent Network services offered subscribers increases, the number of triggers increases, concomitantly increasing the load imposed upon the SCP 106 which creates the triggers, the switching network 104 which communicates the triggers, and the switch 102 which identifies events that satisfy the conditions imposed by the triggers, and handles the responses to the triggered events.

It is noted that the aforementioned problems are exacerbated by the current trends wherein carriers are continually extending the portfolio of specific services they offer to customers, especially mobile services.

One approach for handling overloaded switches and/or signaling networks is simply to add extra network capacity, including switches with more CPUs, more powerful CPUs and more memory, as well as switching equipment to bolster the primary switching network. One diagnostic approach is the deployment of load measuring means, usually signaling probes capable of passively observing switches as well as other primary signaling network components in order to detect the load on the switch and/or signaling network. Knowledge of component overload is then relayed to the appropriate authorities in order to repair and/or upgrade overloaded networks.

U.S. Pat. No. 5,726,972 discloses a monitor probe for a communications signaling network, such as an SS7 network, arranged to determine its own location on the signaling network by watching for a particular type of message which carries the required information in its routing label.

U.S. Pat. No. 6,295,351 discloses method and system to invoke a check of a service package application (SPA) with respect to a communication as the communication is routed through the telecommunications system.

U.S. published patent application 2001/0019606 discloses a method of controlling service execution in an Intelligent Network, including at least one switching point (SSP) and several service programs (SLP).

U.S. published patent application 2002/0034190 discloses a system that uses Idle cellular resources for voice and data services.

U.S. published patent application 2004/0013251 discloses a communication interface between pc's and auxiliary platforms in an Intelligent Network There is an ongoing need for apparatus and methods for enabling the SCP and SSP to provide Intelligent Network services using fewer system resources, obviating the need for expensive switch upgrade or capacity expansion in order to provide more Intelligent Network services. Preferably, the apparatus and methods also enable a load reduction on the primary signaling network which is responsible for switching calls. There is an ongoing need for a more robust Intelligent Network architecture, where more Intelligent Network tasks are performed using components not responsible for primary network functioning.

SUMMARY OF THE INVENTION

The aforementioned needs are satisfied by several aspects of the present invention.

In accordance with some aspects of the present invention, a method of implementing Intelligent Network services in a telecommunications network wherein a switch communicates with SE and with other switches via a first signaling network, wherein the switch communicates with a SCP via a second signaling network is provided. This method includes providing a signaling probe separate from the switch, identifying an event in the first signaling network with the signaling probe and sending a communication describing the event to the SCP.

In particular embodiments, the communication is sent to the SCP via an ancillary network. In specific embodiments, this ancillary network is separate from the switching network. Embodiments wherein the ancillary network is separate from the signaling network allow for the reporting of events of the first signaling network at the SCP without utilizing the core signaling network, thereby providing a robust architecture. In specific embodiments, the present invention reduces the failure risk for the primary signaling network, which is relieved to a certain extent of the need to dedicate resources to Intelligent Network services. Furthermore, for specific embodiments, it is less resource intensive to send Intelligent Network traffic using the ancillary network rather than the primary switching network, and thus embodiments of the present invention reduce the need for costly signaling network capacity.

Embodiments of the present invention provide non-intrusive signaling probes capable of passively observing events in the first signaling network with little or no increase on the network load or on the load on the switch. Furthermore, embodiments of the present invention obviate the need for switches to handle a large number of events according to the instructions and queries received from a SCP. In particular embodiments, the present invention allows for the deployment of Intelligent Network services using fewer triggers and queries, concomitantly reducing the need for expensive switch expansion and/or upgrade.

Any data communication network is appropriate for the ancillary network. In some embodiments, the ancillary network is a packet switched network such as a TCP/IP network. In specific embodiments, the ancillary network is an internet.

The event is identified in the first signaling network using a variety of techniques known in the art. According to exemplary embodiments, the event is identified by listening to signaling traffic on the first signaling network, decoding the signaling traffic, and identifying the event from the decoded signaling traffic. In particular embodiments, the event is identified with a probe listening to the signaling traffic.

Any location within the first signaling network is appropriate for listening to traffic on the first network. Thus, according to specific embodiments, the listening includes detecting electrical signals at a variety of locations, including but not limited to within the switch, on a communication line between the switch and another switch, on a communication line between the switch and subscriber equipment, on a communication line connected to a mobile gateway, and within a mobile gateway.

Embodiments of the present invention provide for listening to signaling traffic encoded in any appropriate protocol, including those known in the art and those yet to be developed. Exemplary switching protocols include protocols appropriate for networks including, but not to GSM, CDMA, GPRS, UMTS and CDMA2000.

In exemplary embodiments, the signaling traffic is encoded in an SS7 switching protocol. Exemplary SS7 protocols include but are not limited to Interim Specification number 41 (IS-41), Interim Specification number 638 (IS-638), Integrated Services Digital Network User Part (SS7) (ISUP), Interoperability Specification (IOS), and Mobile Application Part (MAP).

In some embodiments, events are generated by any type of subscriber equipment such as a mobile handset.

In some embodiments, events are generated by prepaid subscribers.

Embodiments of the present invention provide for the detection and communication of any event that transpires in the first signaling network. Exemplary events include but are not limited to the dialing of a number, an off-hook event, the connection of a voice or data call, the termination of a voice or data call, a roaming event, changing location event during a call or during idle mode, power on and power off at cellular network, a call arriving from another network, a ringing handset, a call being forwarded, a call being answered, the continuation of a call, sending and receiving short messages, and changes of supplementary service user characteristics.

In various embodiments, after the communication describing the event is sent to the SCP, a command is sent from the SCP to the switch. In particular embodiments, this command is sent via the second signaling network, though it is understood that any data network is appropriate for sending the command.

Exemplary commands include but are not limited to commands including instructions to perform an action selected from the group consisting terminating a voice or data call, continuing a voice or data call, transferring a voice or data call from one subscriber to another subscriber, transferring the call to an Intelligent Peripheral, sending message including a text message such as an SMS (short message service), receiving a message including a text message such as an SMS, sending a DTMF (dual tone multi frequency) tone, receiving a DTMF tone, changing a user supplementary service profile, adding or deleting subscriber from a database (such as the home location register (HLR) and or the visitor location register (VLR)), checking a mobile identity and setting up a trigger.

According to some aspects, the present invention provides a system for providing Intelligent Network services in a network wherein a switch communicates with subscriber equipment (SE) and with other switches via a first signaling network, wherein the switch communicates with an SCP via a second signaling network. Embodiments of the present invention provide a system comprising a signaling probe separate from the switch configured to receive event data from the first signaling network and an ancillary communications network providing a data link between the signaling probe and the SCP.

According to particular embodiments, the signaling probe includes at least one data input port, a data bus, a protocol analyzer and a data output port.

The data input ports of embodiments of the present invention can receive data from any location within the first signaling network. Exemplary locations include but are not limited to the switch, on a communication line between the switch and another switch, on a communication line between the switch and subscriber equipment, on a communication line connected to a mobile gateway, and within a mobile gateway.

According to different embodiments, the protocol analyzer is implemented in hardware, in software, or as a combination of hardware and software. Furthermore, in particular embodiments the protocols analyzer is implemented within a modified SCP.

These and further embodiments will be apparent from the detailed description and examples that follow.

DETAILED DESCRIPTION OF THE INVENTION

The numerous innovative teachings of the present application are described below with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 3:
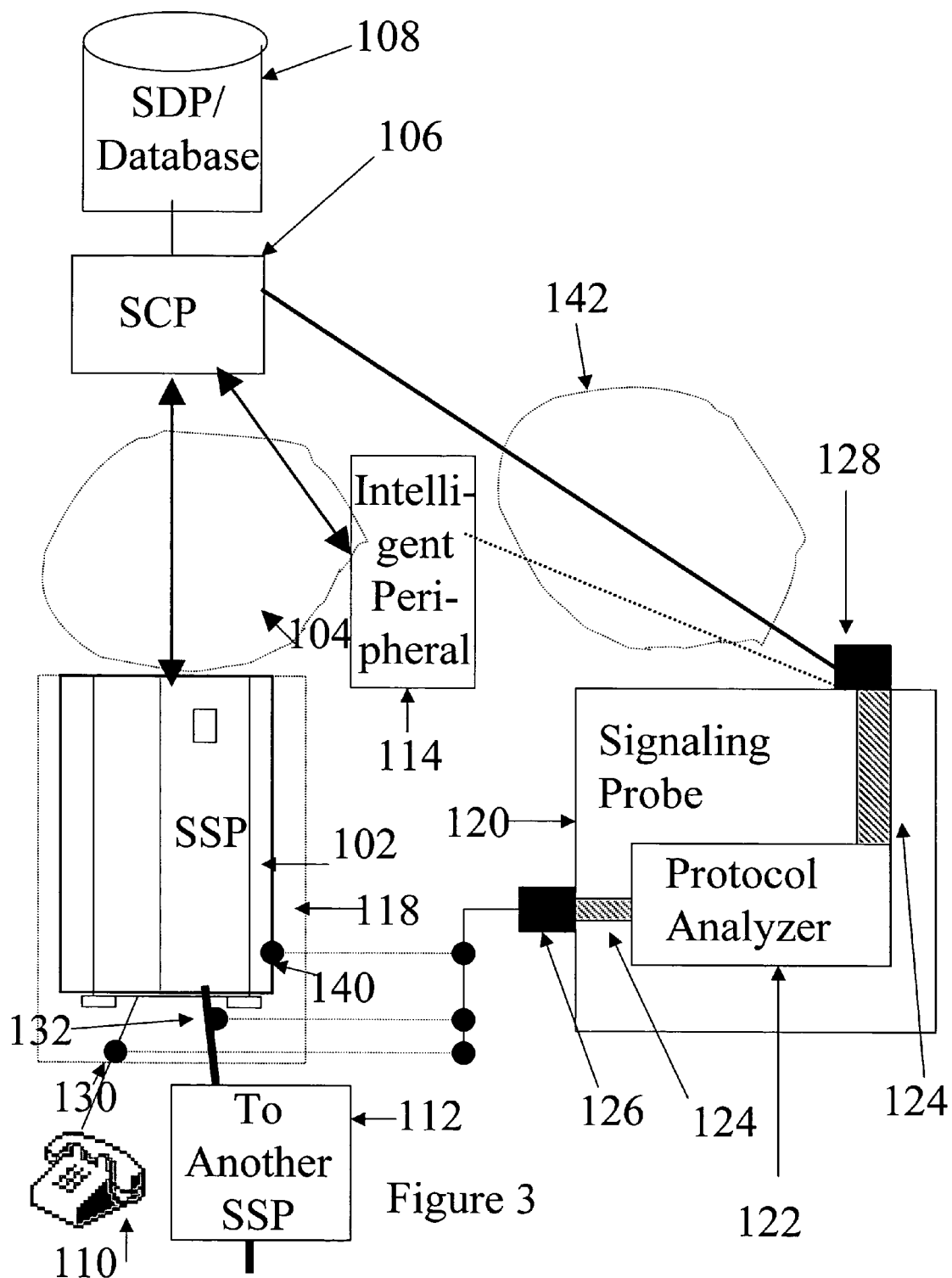
FIG. 3 provides a block diagram of the architecture of some embodiments of the present invention.

FIG. 3 provides a block diagram of the architecture of an exemplary embodiment of the present invention. Subscriber Equipment (SE) 110, such as a telephone, a mobile station, a computer, or a fax, for example, is connected via a first signaling network 118 to a SSP 102 or via a Network Access Point (NAP). The SSP 102 provides the user with access to the network and attends to all necessary dialing functions. According to some embodiments, the SSP is also able to detect the need for an Intelligent Network service request. According to specific embodiments, the SSP includes call management, routing, and service dialing functions. Furthermore, SSPs are capable of communicating with other SSPs 112 across the first signaling network 118. It is noted that appropriate switching network protocols include SS7, GSM, CDMA, GPRS, UMTS and 1XRTT (CDMA2000).

The SSPs 102 communicate using a second signaling network 104 with at least one of SCPs 106, which include Service Logic Programs (SLP), which are used to produce network services. According to some embodiments, the SCPs 106 are capable of communicating with switches in appropriate protocols (e.g. INAP, WIN) for setting up triggers, accepting trigger events, and responding with instructions. It is noted that the second signaling network 104 is also used to switch calls.

Each SCP is optionally connected to one or more Service Data Points (SDP) 108. The SDP 108 is a database containing such data about the subscriber and the Intelligent Network which the SCP service programs use for producing individualized services. The SCP may use SDP services directly by way of a signaling or data network.

The optional Intelligent Peripheral (IP) 114 provides special functions, such as announcements, and voice and multiple dialing identification.

Figure 1:
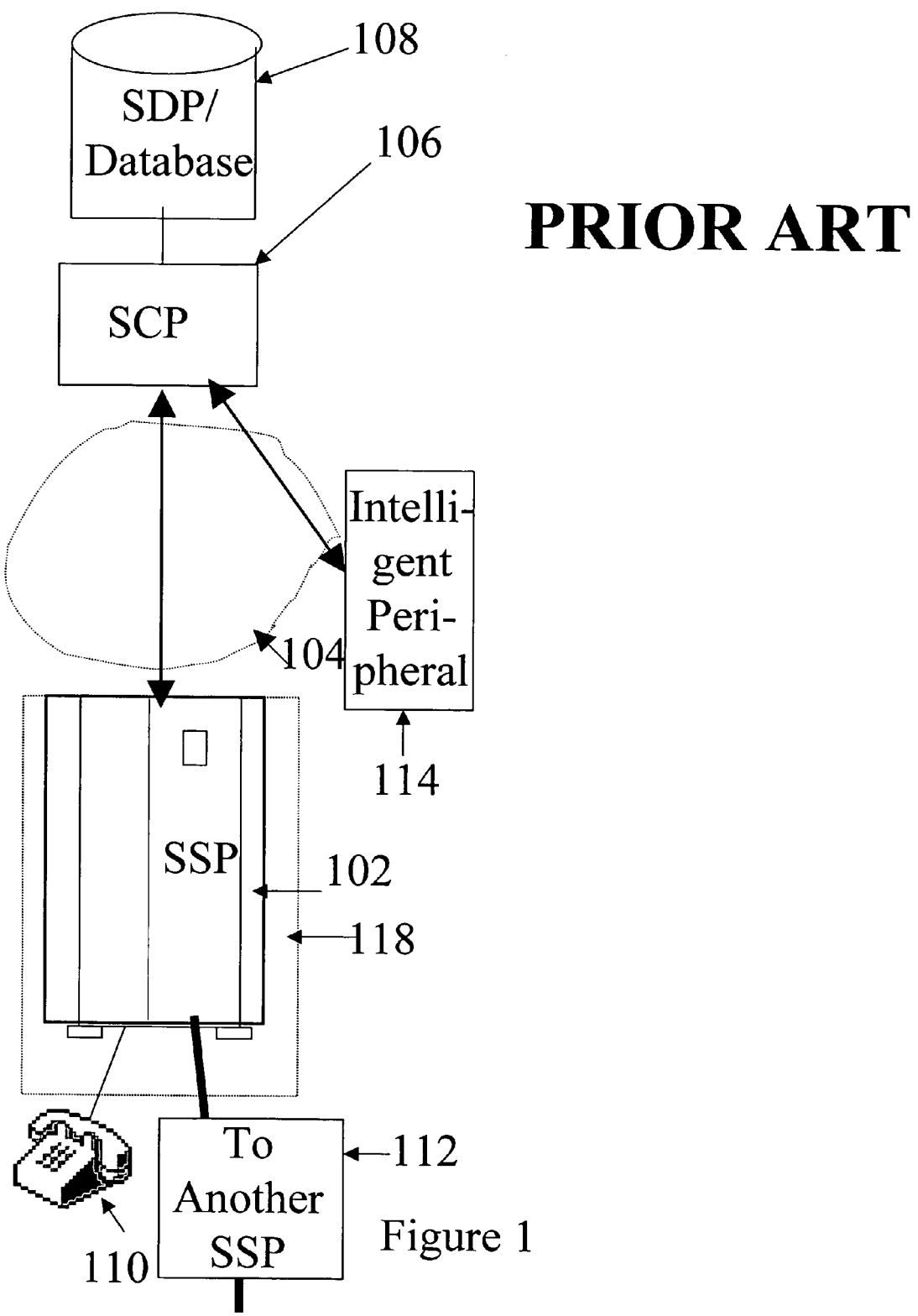
FIG. 1 provides a block figure of prior art architecture of an Intelligent Network.
Figure 2:
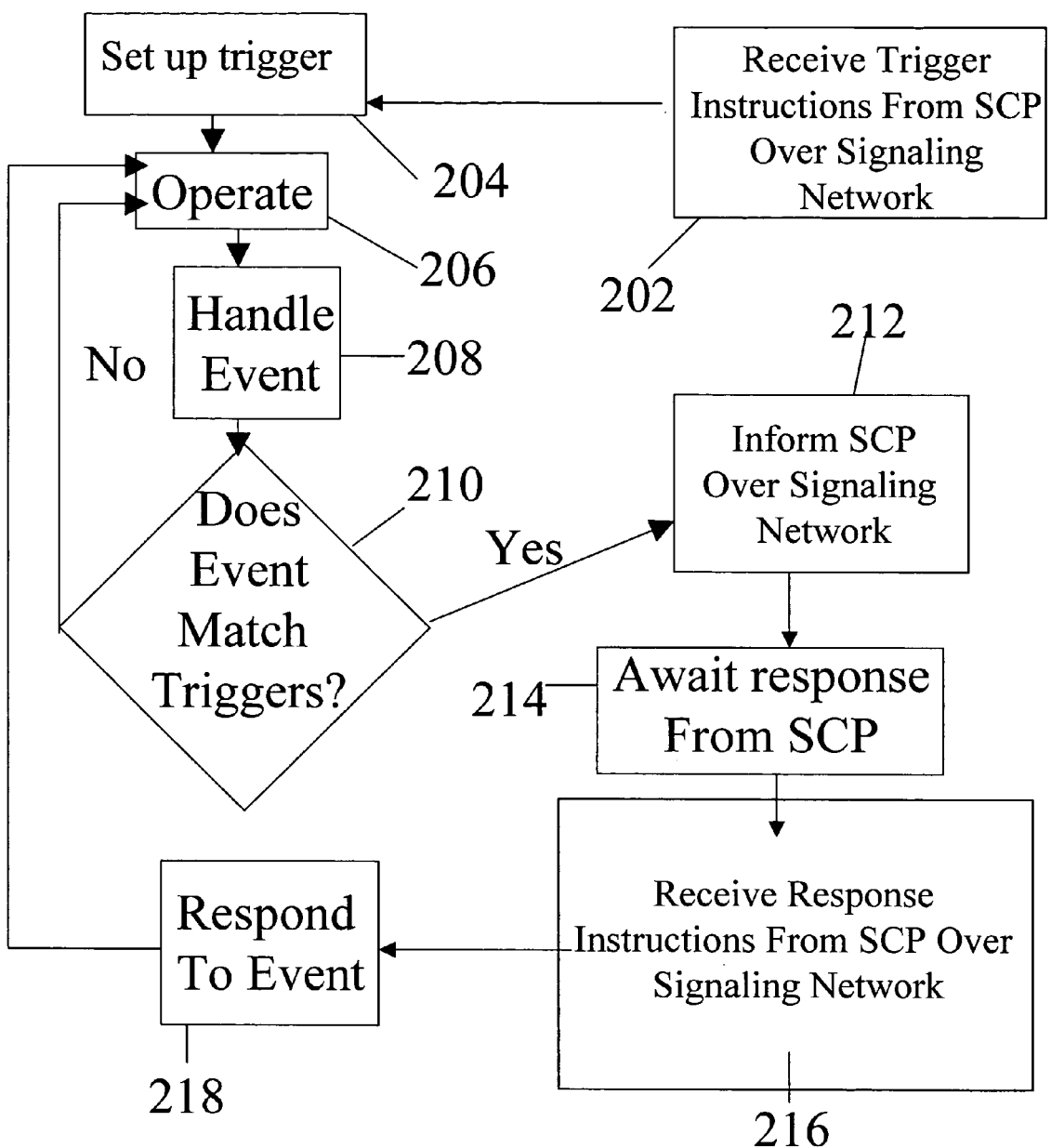
FIG. 2 provides a flow chart of a switch operating and handling events in Intelligent Network.

As with the Intelligent Network described in FIG. 1, the exemplary architecture of the present invention described in FIG. 3 also provides for detection of events transpiring within the first signaling network 118 and handling of these events according to instructions of the SCP 106. Furthermore, some of these events are optionally detected and handled using background art techniques including receiving at the switch 102 a request to establish a trigger from the SCP 106 communicated over the second switching network 104; handling the triggered event at the switch 102 and sending a communication describing the triggered event to the SCP 106 via the second switching network 102; receiving at the switch 102 instructions from the SCP 106 communicated via the second switching network 102; executing these instructions within the first switching network 118, and in particular cases at the switch 102.

Thus, in exemplary embodiments represented in FIG. 3, these aforementioned techniques for Intelligent Network event handling are augmented with other methods. Thus, according some exemplary embodiments of the present invention, at least one event is detected at some point within the first signaling network 118 by a signaling probe 120. This event is detected at any location within the first signaling network 118, including at a location 140 within the switch 102; a location 132 on a communications line between the switch 102 and another switch 112; a location 130 on a communications line between the switch 102 and subscriber equipment 110.

This event is received by the signaling probe 120 through a data input board 126. The signaling probe 120 includes a databus 124 and a data output port 128 from which it can communicate data to the SCP 106. In one exemplary embodiment, the signaling probe includes a protocol analyzer 122 for analyzing traffic observed from the first signaling network 118.

The present invention provides protocol analyzers capable of decoding signaling network traffic encoded in any appropriate protocol. In certain exemplary embodiments, the signaling network traffic is encoded in protocols appropriate for signaling networks such as a global system for mobile communications (GSM) network, a code division multiple access (CDMA) network, a general packet radio service (GPRS) network, a universal mobile telephone system (UMTS) network and a CDMA2000 network. Exemplary protocols include but are not limited protocols from the SS7 family of protocols. Exemplary SS7 protocols include but are not limited to IS-41, IS-638, ISUP, IOS, and MAP.

The protocol analyzer 122 may be implemented in hardware, in software, or as a combination of hardware and software. Furthermore, in particular embodiments the protocols analyzer is implemented within a modified Service Contact Point (SCP).

In certain embodiments, the output of the protocol analyzer is a description of detected events. In specific embodiments, this description is encoded in particular data structures or using a particular protocol that the SCP 106 can parse and understand. In specific embodiments, the SCP 106 is specially programmed to understand the necessary protocols or data structures in order to handle the logic above the protocol analyzer 122.

Data which is outputted from the output port 128 of the signaling probe is sent to the SCP 106, preferably using an ancillary network 142. In particular embodiments, the ancillary network is a wide area packet switched network such as an internet or an Ethernet.

It is noted for embodiments depicted in FIG. 3 that the described signaling probe 120 and ancillary network 142 do not replace the elements described in FIG. 1 for providing Intelligent Network services, but function side-by-side with these elements, imbuing the network with its "hybrid" nature.

Figure 4:
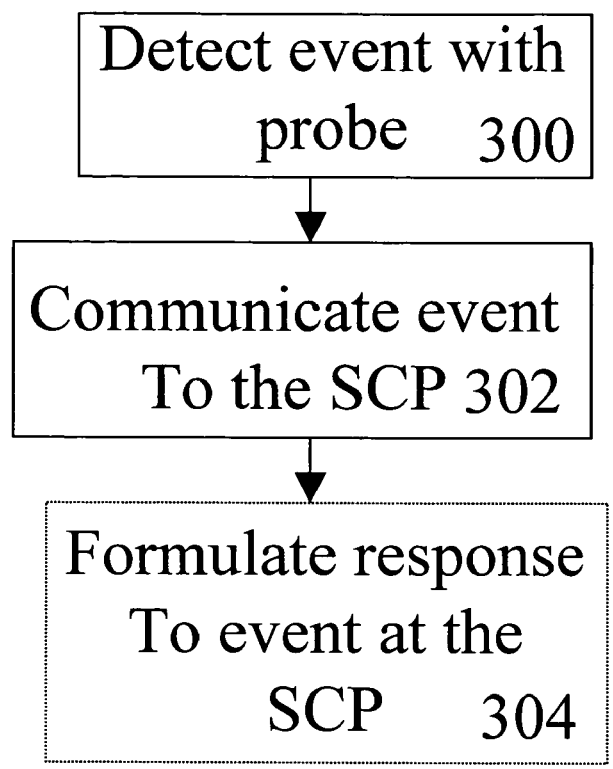
FIG. 4 provides a flow chart describing particular embodiments of the present invention.

FIG. 4 provides a flowchart of the event handling process of embodiments of the present invention. First, an event is detected 300 with the signaling probe 120. This event is communicated 302 to the SCP 106, preferably using the ancillary network 142. Subsequently, a response to the event is optionally formulated 304 at the SCP 106.

Appropriate responses include but are not limited to doing nothing and sending a command from the SCP 106 to the switch 102, using a communications network such as the second switching network 104.

In particular embodiments, appropriate commands include instructions to the switch to perform an action. Appropriate such actions include but are not limited to terminating a voice or data call, continuing a voice or data call, transferring a voice or data call from one subscriber to another subscriber, transferring the call to an Intelligent Peripheral 114, sending a message including a text message such as an SMS (short message service), receiving a message including a text message such as an SMS, sending a DTMF (dual tone multi frequency) tone, receiving a DTMF tone, changing a user supplementary service profile, adding or deleting subscriber from a database such as the home location register (HLR) and or the visitor location register (VLR), checking a mobile identity and setting up a trigger.

According to certain embodiments of the present invention, events transpiring in the first signaling network are classified into events wherein the SCP only needs to be informed of their occurrence (hereinafter "Type A events"), and events wherein the SCP needs to potentially intervene by sending a command to the switch ("Type B events").

According to some particular embodiments, Type B events are handled according to background art techniques involving setting up triggers at the switch and having the switch itself determine the event, while Type A events are detected by the signaling probe without intervention of the switch, and communicated to the SCP using the ancillary network.

Figure 5:
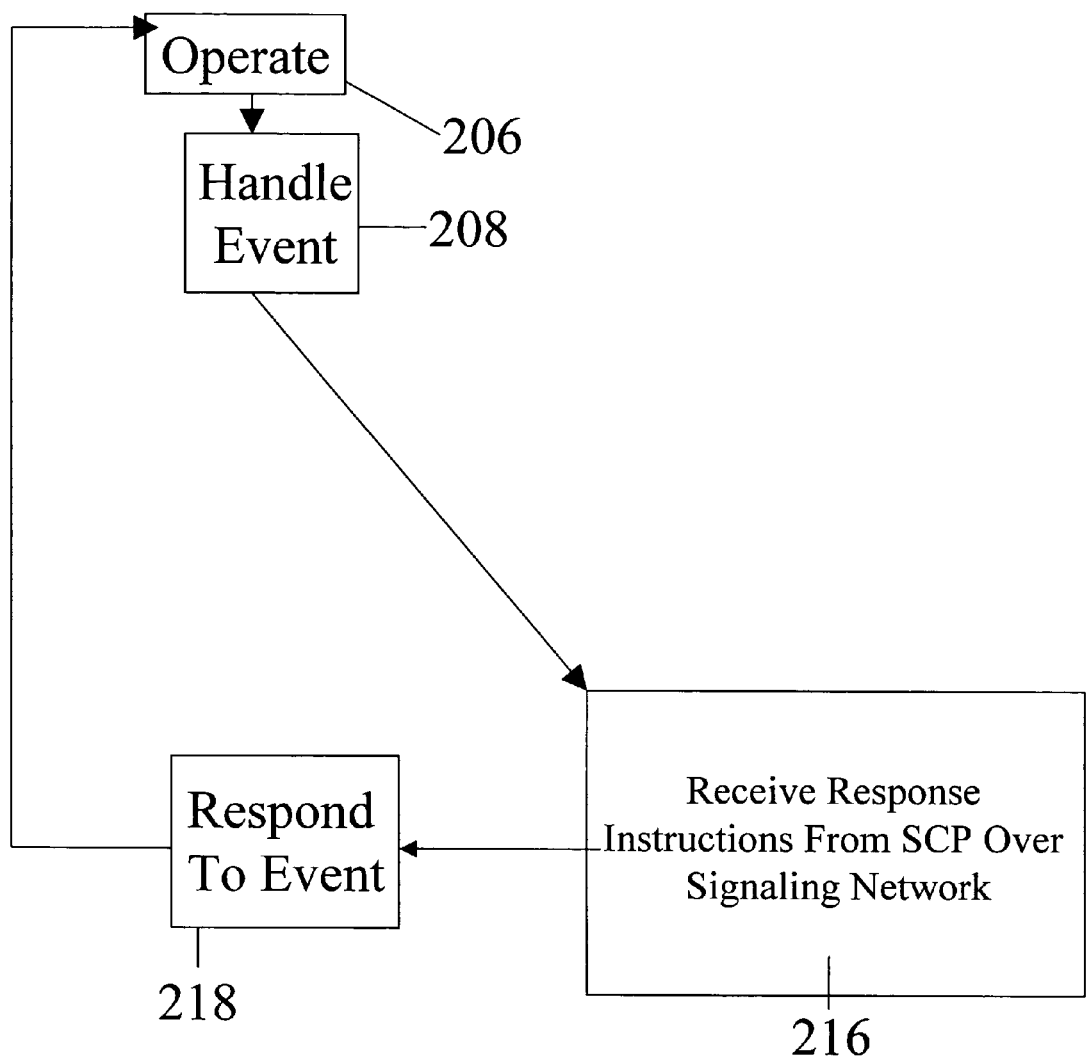
FIG. 5 provides a flow chart of a switch handling events according to specific embodiments of the present invention.

FIG. 5 provides a flow chart describing, for a particular embodiment of the present invention, how a switch handles a Type B event, such as an off-hook event. The switch, in the course of normal operations 206, handles the event 208, irrespective of the Intelligent Network services associated with the event. Meanwhile, unbeknownst to the switch, the event is detected by the probe and communicated to the SCP via the ancillary network. In the event that no instructions are received from the SCP, there is no need for the switch to handle Intelligent Network services associated with the event. Otherwise, the switch receives the appropriate response from the SCP 216, preferably communicated using the signaling network, and responds to the event 218.

The following examples are to be considered merely as illustrative and non-limiting in nature. It will be apparent to one skilled in the art to which the present invention pertains that many modifications, permutations, and variations may be made without departing from the scope of the invention.

EXAMPLE 1

Implementing a "Pre-Paid" Service

The "pre-paid" subscriber of a telecommunications network is only trusted to use its services to the extent that he keeps a positive "pre-paid" balance in his account. The main challenge in this system is to keep track of the subscribers' usage of the network, and his/her balance in real time, and to take action when the subscriber is about to over-draw his account.

Such action can be to notify the subscriber that his balance is depleted and enable him to deposit (recharge) his account, simply to deny further services or even to disconnect ongoing calls.

The traditional Intelligent Network implementation involves:
  Setting up triggers for the subscriber for every potential action he can take
  Setting up a special SCP for handling "pre-paid" transactions.
  Every time a pre-paid subscriber perform an action, the switch needs to inform the SCP, and receive permission to proceed, or instructions for handing a depleted balance.
  During a call, the switch is instructed to check with the SCP periodically, again in order to receive permission to proceed, or instructions for handing a depleted balance.

According to exemplary embodiments, certain events are designated as "type A events" wherein the SCP only needs to be informed, while other events are designated as "type B events," potentially involving a command or query or other communication sent from the SCP to the switch.

According to specific embodiments, when a pre-paid subscriber has a balance over a pre-selected limit, events related to this pre-paid subscriber's balance are designated as "type A events"; when the subscriber's balance is below the pre-selected limit, events related to this pre-paid subscriber's balance are designated as "type B events."

Thus, according to particular embodiments, appropriate triggers relating to the balance of these prepaid subscriber are only established at the switch for the "type B events," or when the pre-paid subscriber's balance drops below the pre-selected limit.

According to these embodiments, events relating to subscriber's balance handled by the signaling probes when the pre-paid subscriber's balance is remains above this pre-selected limits. In the event that the pre-paid subscriber's balance drops below this limit, the SCP establishes an appropriate trigger at the switch, sending the request to establish the trigger via the signaling network to the switch. At that point, events relating to the pre-paid subscriber's balance are treated as "type A events" and handled with traditional techniques.

EXAMPLE 2

Implementation of Location Based Services

In certain embodiments, it is desired to offer location based services to subscribers according to the approximate geographic location of a subscriber's handset. In exemplary embodiments, these services include notifying a subscriber of a commercial activity related to a specific geographic point of interest, such as a shop, restaurant, etc. In another exemplary embodiment, the rate charged for incoming or outgoing data or voice calls is modified according to the subscriber's geographic location. Another example is mobile emergency service, or "mobile *911."

In specific embodiments, the location of the subscriber is assumed to be in proximity of the nearest antenna (cell) that communicates with the subscriber's handsets.

Currently, location based services are implemented using triggers, wherein a SCP sets up a trigger at the switch for each handset. Each time a handset moves from one cell to another cell, the switch needs to notify the SCP, using the second signaling network. The SCP monitors the location of active subscribers.

Exemplary embodiments of the present invention enable the SCP to monitor the location of certain subscribers without using triggers. A subscriber's presence in a certain cell is detected by the signaling probe and reported to an SCP over the ancillary network.

Optionally, the SCP sends a command to a switch, or performs another action upon being informed by the probe of a subscriber's presence in a certain cell.

According to particular embodiments, some or even all of network subscribers network are be located without the need to access or modify network data bases including the HLR and the VLR. In certain embodiments, methods and apparatus are provided for locating users registered on a network that are not subscribers of a particular network and hence subscribed at the HLR. Thus, particular embodiments relate to the location of roamers as well as network subscribers.

EXAMPLE 3

Callback Service for Busy Number

Many providers offer a "callback" service to subscribers who attempt to call a busy numbers. This enables source subscriber who initially receives a busy signal upon placing a voice or data call to destination subscriber equipment to subsequently instruct the network to automatically place the call upon detecting that the destination network equipment is no longer busy.

In many current implementations, the SCP sends a request to the switch to establish a trigger corresponding to network event whereby the destination subscriber equipment is no longer busy. Thus, the switch must periodically ascertain whether or not the subscriber equipment is no longer busy. In the event that the condition is met, the switch conveys this information to the SCP using the second signaling network.

According to exemplary embodiments of the present invention, the signaling probe detects the termination of a phone call involving the destination subscriber equipment, and conveys this information to the SCP using the ancillary network.

The SCP is informed of the event, and in the event that a source subscriber has requested the callback service, the SCP sends an appropriate command to the switch to place the call between the source subscriber and the destination subscriber.

While the present invention has been particularly described, persons skilled in the art will appreciate that many variations and modifications can be made. Therefore, the invention is not to be construed as restricted to the particularly described embodiments, rather the scope, spirit and concept of the invention will be more readily understood by reference to the claims which follow.

What is claimed is:

1. In a telecommunications network wherein a switch communicates with subscriber equipment (SE) and with other switches via a first signaling network, wherein the switch communicates with a Service Contact Point (SCP) via a second signaling network, a method of implementing Intelligent Network services comprising:
    a) providing a signaling probe separate from the switch;
    b) identifying an event in the first signaling network with said signaling probe; and
    c) sending a communication describing said event to the SCP.

2. The method of claim 1 further comprising the step:
    d) providing an ancillary network,
wherein said communication is sent to said SCP via said ancillary network.

3. The method of claim 2, wherein said ancillary network is a packet switched network.

4. The method of claim 3 wherein said ancillary network is a TCP/IP network.

5. The method of claim 4 wherein said ancillary network is an internet.

6. The method of claim 1 wherein said event is identified by the steps:
    i) listening to signaling traffic on said first signaling network;
    ii) decoding said signaling traffic;
    iii) identifying, from the decoded signaling traffic, said event.

7. The method of claim 6 wherein said signaling traffic is encoded by a protocol appropriate for a network selected from the group consisting of fixed-line, GSM, CDMA, GPRS, UMTS and CDMA2000.

8. The method of claim 6 wherein said signaling traffic is encoded by a SS7 protocol.

9. The method of claim 8 wherein said SS7 protocol is selected from the group consisting of Interim Specification number 41 (IS-41), Interim Specification number 638 (IS-638), Integrated Services Digital Network User Part (SS7) (ISUP), Interoperability Specification (IOS), and Mobile Application Part (MAP).

10. The method of claim 6 wherein said listening includes detecting electrical signals within said first network.

11. The method of claim 6 where said listening includes detecting electrical signals within the switch.

12. The method of claim 6 where said listening includes detecting electrical signals on a communication line selected from the group consisting of a communication line between the switch and another switch, a communication line between the switch and subscriber equipment, and a communication line connected to a mobile gateway.

13. The method of claim 6 where said listening includes detecting electrical signals within a mobile gateway.

14. The method of claim 1 wherein said event is generated by subscriber equipment.

15. The method of claim 1 wherein said event is generated by a mobile handset.

16. The method of claim 1 wherein said event is generated by a prepaid subscriber.

17. The method of claim 1 where said event is selected from the group consisting of dialing of a number, an off-hook event, the connection of a voice call, the connection of a data call, the termination of a voice call, the termination of a data call, a roaming event, changing location event during a call, changing location event during idle mode, power on at a cellular network, power off at cellular network, a call arriving from another network, a ringing handset, a call being forwarded, a call being answered, the continuation of a call, sending of at least one short message, the receiving of at least one short message, and changes of supplementary service user characteristics.

18. The method of claim 1 further comprising
    d) sending a command from said SCP to the switch.

19. The method of claim 1 wherein said command is sent from said SCP to the switch using the second signaling network.

20. The method of claim 18 wherein said command comprises instructions to perform an action selected from the group consisting of terminating a voice call, terminating a data call, continuing a voice call, continuing a data call, transferring a voice call from one subscriber to another subscriber, transferring a data call from one subscriber to another subscriber, transferring a call to an Intelligent Peripheral, sending a message, receiving a message, sending a DTMF (dual tone multi frequency) tone, receiving a DTMF tone, changing a user supplementary service profile, adding a subscriber to a database, deleting a subscriber from a database, checking a mobile identity and setting up a trigger.

21. The method of claim 20 wherein said message is a text message.

22. The method of claim 21 wherein said text message is a short message service (SMS) message.

23. The method of claim 20 wherein said database is selected from the group consisting of a home location register (HLR) database and a visitor location register (VLR) database.

24. In a network wherein a switch communicates with subscriber equipment (SE) and with other switches via a first signaling network, wherein the switch communicates with a Service Contact Point (SCP) via a second signaling network, a system for providing Intelligent Network services comprising:
   a) a signaling probe separate from the switch configured to receive event data from the first signaling network;
   b) an ancillary communications network providing a data link between said signaling probe and the SCP.

25. The system of claim 24 wherein said signaling probe comprises at least one data input port, a data bus, a protocol analyzer and a data output port.

26. The system of claim 25 wherein said protocol analyzer is configured to analyze data encoded in a protocol appropriate for a network selected from the group consisting of fixed line, GSM, CDMA, GPRS, UMTS and CDMA2000.

27. The system of claim 25 wherein said protocol analyzer is configured to analyze data encoded in an SS7 protocol.

28. The system of claim 27 wherein said SS7 protocol is selected from the group consisting of Interim Specification number 41 (IS-41), Interim Specification number 638 (IS-638), Integrated Services Digital Network User Part (SS7) (ISUP), Interoperability Specification (IOS), and Mobile Application Part (MAP).

29. The system of claim 25 wherein at least one said data input port is connected to the switch.

30. The system of claim 25 wherein at least one said data input port is connected to a communication line selected from the group consisting of a communication line between the switch and another switch, a communication line between the switch and subscriber equipment, and a communication line connected to a mobile gateway.

31. The system of claim 25 wherein at least one said data input port is connected to a mobile gateway.

32. The system of claim 24 wherein said signaling probe physically separated from the switch.

33. The system of claim 24 wherein said ancillary communications network is a packet switched network.

34. The system of claim 33 wherein said ancillary communications network is a TCP/IP network.

35. The system of claim 34 wherein said ancillary communications network is an internet.

* * * * *